3,080,320
METHOD FOR PREPARING FERROMAGNETIC OXIDES

Ronald C. Vickery, Malibu, Calif., assignor to Nuclear Corporation of America, Denville, N.J., a corporation of Delaware
No Drawing. Filed Aug. 4, 1960, Ser. No. 47,361
10 Claims. (Cl. 252—62.5)

This invention relates to a method for preparing ferromagnetic oxides and, more particularly, is concerned with the manufacture of complex oxides including rare earth metal oxides and both divalent and trivalent iron oxides, commonly known as "rare earth ferrites."

Oxides of the above mentioned type are well known and have been found useful in numerous fields, such as electrical and electronic devices using magnetic cores, microwave and magnetic data recording systems. Heretofore, such rare earth ferrites have been prepared by sintering together iron oxide with the rare earth metal oxide, generally gadolinium or yttrium oxide. In order to produce the desired result, the sintering step must be conducted under rigorous conditions of temperature and atmosphere control. As a result, the conventional method involves the use of special equipment operated by skilled operators to maintain the reaction conditions continuously within the ranges required.

There is a need for preparing the complex oxides contemplated herein by a simplified method and the present invention provides such a method in which no specific control of temperature and atmosphere during the reaction is necessary.

Generally speaking, and in contrast with the conventional method, the present invention relates to the preparation of complex oxides, containing iron oxides and rare earth metal oxides, by precipitation from an aqueous medium, so that the deficiencies of the conventional methods are avoided.

It has been found that, when treating an alloy of iron and a rare earth metal, such as gadolinium or yttrium, with an aqueous solution of phosphoric acid, a complex rare earth oxide-iron oxide is obtained as a precipitate which can be separated readily from the liquid medium by filtration, for example.

The mechanism of the reaction involved is not entirely understood. In contrast with the general rule that precipitates prepared from aqueous acid solutions appear in the hydrated form, the present case is an exception to the rule inasmuch as the product obtained in accordance with the invention always has been found to be the anhydrous oxide.

Furthermore, it has been established that preparing an iron-rare earth metal alloy prior to the digestion step is a necessary requirement. Tests revealed that dissolving the components without prior alloying does not lead to the desired oxide formation, but rather to the dissolution of the components, or the corresponding phosphate is precipitated, provided it is insoluble in the liquid medium.

Further, of all possible rare earth metal-iron compounds which may be present in an alloy of both components, only a certain type forms the complex oxides contemplated herein. Referring, by way of example, to gadolinium which has been especially investigated, it was found that apparently only the assumed alloy $GdFe_2$ yielded an oxide product. For this and other reasons it is believed that an inter-metallic compound, $GdFe_2$, exists. When alloying gadolinium with iron in the atomic ratio of 1:2, and dissolving the resulting product in dilute phosphoric acid, a practically quantitative yield of a complex gadolinium oxide-iron oxide precipitate is obtained. An excess of either of the components over the atomic ratio 1:2 reacts as described above. In other words, and referring to the composition $GdFe_2$, for example, uncombined iron goes into solution, while uncombined gadolinium forms the white gadolinium phosphate.

The foregoing conclusions are further confirmed by test results showing that compositions corresponding to the formula $GdFe_4$ or $YFe_4$ do not yield the desired oxide product, but go directly into solution and yield precipitates of the corresponding rare earth phosphate.

The assumption of intermetallic compounds, corresponding to the formulae $GdFe_2$ or $YFe_2$, respectively, appears to be justified also on metallographic and radiographic grounds not germane to this invention. It supplies a plausible explanation for the fact that, of all Gd—Fe combinations tested, only the alloy with atomic ratio 1:2 produces the desired result.

With respect to the digesting agent, it has been established that acids based generally upon phosphorus-oxygen anions react with the rare earth metal-iron compositions to form the desired complex oxides. However, the preferred reagent is phosphoric acid, this term including meta-, ortho- and pyrophosphoric acids, and it has been found that concentratons below 10% by weight must be used. With higher concentrations exceeding the 10% level, dissolution of the alloys may occur.

The results of experiments conducted with hydrochloric, nitric, sulphuric or perchloric acids were negative. Of all acids tested, only dilute, 5–10%, phosphorus-containing acids react as described above to yield the complex anyhdrous oxide. The other acids, as well as more concentrated phosphoric acids, dissolve the alloy instead of precipitating the complex oxide.

In the case of an iron-gadolinium alloy, the anhydrous complex oxide precipitated corresponds to the formula. $Gd_2O_3(FeO)x.(Fe_2O_3)y$. When using yttrium the corresponding yttrium oxide-iron oxide is obtained, and other rare earth metals produce similar compositions. Referring specifically to gadolinium, it has been found that the ratio $x:y$ in the final product can be controlled by adjusting the reaction conditions with respect to time and temperature. The ratio $x:y$ indicates the ratio $FeO:Fe_2O_3$ which, in the reaction

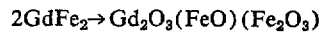
$$2GdFe_2 \rightarrow Gd_2O_3(FeO)(Fe_2O_3)$$

is 1:0.5. Digestion of the alloys in dilute phosphoric acid has been investigated for different periods of time up to five days and it was found that the longer the period of digestion, the more $Fe_2O_3$ and less FeO was produced. Accordingly, $x$ decreases and $y$ increases in the above formula. Similarly, the temperature during digestion influences the $x:y$ ratio to a certain extent, and this step is preferably conducted at the boiling point. This variability of the $x:y$ ratio is of importance in the production of "rare earth ferrites" since it permits the controlled preparation of materials of varying magnetic properties.

In order to produce a complex oxide of the type contemplated herein, and now referring to the gadolinium-iron composition as a typical example, an alloy of gadolinium with iron is prepared by arc-melting together the constituent metals. This alloy may be heat-treated to promote formation of the assumed 1:2 intermetallic compound $GdFe_2$. The resulting alloy is digested in dilute phosphoric acid to form a precipitate of

$$Gd_2O_3.(FeO)x.(Fe_2O_3)y$$

The product is washed until free of excess phosphoric acid and any coexistent, non-magnetic precipitate. The preferred technique for this purpose provides for the product to be retained in the bottom of a dish by means of a magnet, while a fluid, preferably water, is conducted over the material. The washed product is then filtered off and dried. In some instances, sintering the final filter cake has been found advantageous, and this step may be employed for obtaining the desired final shape of the material.

Qualitative and quantitative measurements of the properties of the product were made and it was found that the complex oxides produced in accordance with the invention are the same as those of conventionally prepared oxides.

The invention will be further illustrated by the following examples.

Example 1

This example refers to a detailed description of the preparation of the complex gadolinium oxide-iron oxide compound.

Metallic iron and metallic gadolinium were melted together in an electric arc to form an alloy, which was subsequently heat-treated at 850° C. for 100 hours, so that the material obtained included a major portion corresponding to the formula $GdFe_2$. The resulting alloy was comminuted to facilitate dissolution and 20 grams of the powder were digested in 600 ml. of 5% orthophosphoric acid at 100° C. for 48 hours. The digestion step was conducted under reflux conditions to avoid evaporation of the solvent. The alloy decomposed slowly to form a black powdery deposit. Simultaneously, a precipitate of white gadolinium phosphate was formed and a little iron appeared in solution, each of them originating from an excess of gadolinium or iron which had remained uncombined and, therefore, did not form part of the composition $GdFe_2$.

After 48 hours, decomposition was complete; the product was washed by decantation until free of excess phosphoric acid and any coexistent gadolinium phosphate. For this purpose, the product was retained in a dish by means of a magnet below and adjacent the bottom of the dish. Simultaneously, a vigorous flow of water was conducted over the precipitate.

The washed material was then filtered off, dried and analyzed. The analysis result indicated that the final product had the formula $Gd_2O_3 \cdot (FeO)x \cdot (Fe_2O_3)y$, where the ratio $x:y$ was 1:0.7. Another portion of the same heat-treated alloy was digested to decomposition for five days. The $x:y$ ratio of the resultant product was 1:1.

The magnetic properties of the resulting materials were tested and found to be of the same order as those of identical materials prepared by conventional methods. More specifically, the Curie temperature for the material of $x:y$ ratio 1:0.7 was established at 500° C. and the value for saturation magnetization was found to be $\sigma = 125$, expressed in c.g.s. units.

Example 2

This example relates to the preparation of the complex yttrium oxide-iron oxide corresponding to the gadolinium compound of Example 1.

The steps and reaction condition are analogous to those of Example 1. The intermetallic compound $YFe_2$ is prepared by arc melting and heat-treating the resulting alloy. It is then digested in acid, washed and filtered to yield a filter cake of a substance having the formula $Y_2O_3 \cdot (FeO)x \cdot (Fe_2O_3)y$.

It will be obvious to those skilled in the art that many modifications may be made within the scope of the present invention wtihout departing from the spirit thereof, and the invention includes all such modifications.

What is claimed is:

1. A method for producing ferromagnetic oxides, which comprises alloying a rare earth metal with iron in the atomic ratio of 1 to 2, digesting the resulting product in an aqueous solution of an acid containing phosphorus-oxygen anions to form a precipitate of a complex rare earth metal oxide-iron oxide, the concentration of the acid in said solution being sufficient to digest the product, but not exceeding about 10% by weight, and separating the precipitate from the solution.

2. A method for producing a feromagnetic oxide, which comprises alloying a rare earth metal selected from the group consisting of yttrium and gadolinium with iron in the atomic ratio of 1 to 2, digesting the resulting product in an aqueous solution of a phosphoric acid to form a precipitate of a complex rare earth metal-iron oxide, the concentration of the acid in said solution being sufficient to digest the product, but not exceeding about 10% by weight, and separating the precipitate from the solution.

3. A method for producing a ferromagnetic oxide, which comprises alloying gadolinium with iron in the atomic ratio of 1 to 2, digesting the resulting product in an aqueous solution of a phosphoric acid to form a precipitate of a complex gadolinium-iron oxide, the concentration of the acid in said solution being sufficient to digest the product, but not exceeding about 10% by weight, and separating the precipitate from the solution.

4. A method according to claim 1 in which the digestion step is conducted at elevated temperature.

5. A method according to claim 1 in which the digestion step is conducted at the boiling point of the acid solution.

6. A method for producing ferromagnetic oxides which comprises alloying a rare earth metal with iron in the atomic ratio of 1 to 2, digesting the resulting product in an aqueous solution of a phosphoric acid to form a precipitate of a complex rare earth metal oxide with bivalent and trivalent iron oxides, the concentration of the acid in said solution being sufficient to digest the product, but not exceeding about 10% by weight, terminating the digestion step when the desired ratio of bivalent to trivalent oxides is reached, and separating the precipitate from the solution.

7. A method for producing ferromagnetic oxides, which comprises alloying a rare earth metal with iron in the atomic ratio of 1 to 2, heat-treating the resulting material to promote formation of the intermetallic compound $MeF_2$ wherein Me is the rare earth metal, digesting the resulting product in an aqueous solution of an acid containing phosphorus-oxygen anions to form a precipitate of a complex rare earth metal-iron oxide, the concentration of the acid in said solution being sufficient to digest the product, but not exceeding about 10% by weight, and separating the precipitate from the solution.

8. A method for producing a ferromagnetic oxide which comprises alloying gadolinium with iron substantially in the atomic ratio of 1:2, heat-treating the resulting material to promote the formation of the intermetallic compound $GdFe_2$, digesting the resulting product in an aqueous solution of a phosphoric acid, the acid content of the solution being sufficient to digest the product, but not exceeding about 10 percent by weight, to form a precipitate of a complex oxide corresponding generally to the formula $Gd_2O_3 \cdot (FeO)x \cdot (Fe_2O_3)y$, wherein the values of $x$ and $y$ are such that the ratio $x:y$ is within the range of 1:0.5 to 1:1, and separating the precipitate from the solution.

9. A method for producing a ferromagnetic oxide which comprises alloying gadolinium with iron substantially in the atomic ratio of 1:2, digesting the resulting product in an aqueous solution of phosphoric acid containing 5 to 10% by weight of the acid to form a precipitate including a complex oxide corresponding generally to the formula $Gd_2O_3 \cdot (FeO)x \cdot (Fe_2O_3)y$, wherein the values of $x$ and $y$ are such that the ratio $x:y$ is within the range of 1:0.5 to 1:1, separating the precipitate from the solution and isolating the complex oxide.

10. A method for producing a ferromagnetic oxide which comprises alloying gadolinium with iron substantially in the atomic ratio of 1:2, digesting the resulting product in a dilute aqueous solution of phosphoric acid containing 5 to 10% by weight of the acid to form a precipitate including a complex oxide corresponding generally to the formula $Gd_2O_3.(FeO)x.(Fe_2O_3)y$, wherein the values of $x$ and $y$ are such that the ratio $x:y$ is within the range of 1:0.5 to 1:1, separating the precipitate from the solution and isolating the complex oxide, the isolating step including arranging the precipitate in a predetermined zone, subjecting the zone to a magnetic field in order to retain the ferromagnetic component of the precipitate within the zone, and simultaneously passing a fluid through the zone whereby non-magnetic substances are removed.

References Cited in the file of this patent

UNITED STATES PATENTS

| | | |
|---|---|---|
| 2,276,075 | Wuensch | Mar. 10, 1942 |
| 2,428,228 | Keck | Sept. 30, 1947 |
| 2,957,827 | Nielsen | Oct. 25, 1960 |

FOREIGN PATENTS

| | | |
|---|---|---|
| 763,494 | Great Britain | Dec. 12, 1956 |

OTHER REFERENCES

Anderson: Supplement to J. of Applied Physics, vol. 30, No. 4, April 1959, page 299S.